United States Patent
Hsu

(10) Patent No.: US 8,579,517 B2
(45) Date of Patent: Nov. 12, 2013

(54) OPTICAL FIBER CONNECTOR

(75) Inventor: Chia-Ling Hsu, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 315 days.

(21) Appl. No.: 13/106,867

(22) Filed: May 13, 2011

(65) Prior Publication Data

US 2012/0251052 A1 Oct. 4, 2012

(30) Foreign Application Priority Data

Apr. 1, 2011 (TW) .............................. 100111608 A

(51) Int. Cl.
*G02B 6/38* (2006.01)

(52) U.S. Cl.
USPC .......................................................... 385/74

(58) Field of Classification Search
USPC .......................................................... 385/74
See application file for complete search history.

(56) References Cited

U.S. PATENT DOCUMENTS 6,241,399 B1 * 6/2001 Nobuhara ........................ 385/84

FOREIGN PATENT DOCUMENTS

JP 2007041222 A * 2/2007

* cited by examiner

*Primary Examiner* — Ryan Lepisto
*Assistant Examiner* — Erin Chiem
(74) *Attorney, Agent, or Firm* — Altis & Wispro Law Group, Inc.

(57) ABSTRACT

An optical fiber connector includes a number of optical fibers, a body, a number of supports, and a cover. The body includes a number of lenses at a first end thereof, a number of through holes at an opposite second end, and a recess located between the lenses and the through holes. The through holes are in communication with the recess. The optical fibers extend through the respective through holes and optically coupled with the respective lenses. The supports are formed in the recess. Each support defines an arc-shaped receiving groove. The cover is engagingly received in the recess and defines a number of V-shaped positioning grooves. Each positioning groove has a first slanted surface and a second slanted surface. The positioning grooves and the corresponding receiving grooves cooperatively securely retain distal portions of the optical fibers in the recess of the body.

17 Claims, 6 Drawing Sheets

OPTICAL FIBER CONNECTOR

BACKGROUND

1. Technical Field

The present disclosure relates to optics and, particularly, to an optical fiber connector.

2. Description of Related Art

Optical fiber connectors typically include a lens and a blind hole behind the lens. The bind hole receives an optical fiber. The lens receives and guides light from/to the optical fiber.

Injection molding is a popular method of fabricating optical fiber connectors. A mold used includes a core pin to form the blind hole. During the injection molding process, however, the core pin may be bent by impact of introduced molding material, thus producing a blind hole out of spec.

Therefore, it is desirable to provide an optical fiber connector, which can overcome or at least alleviate the limitations described.

DETAILED DESCRIPTION

Figure 1:
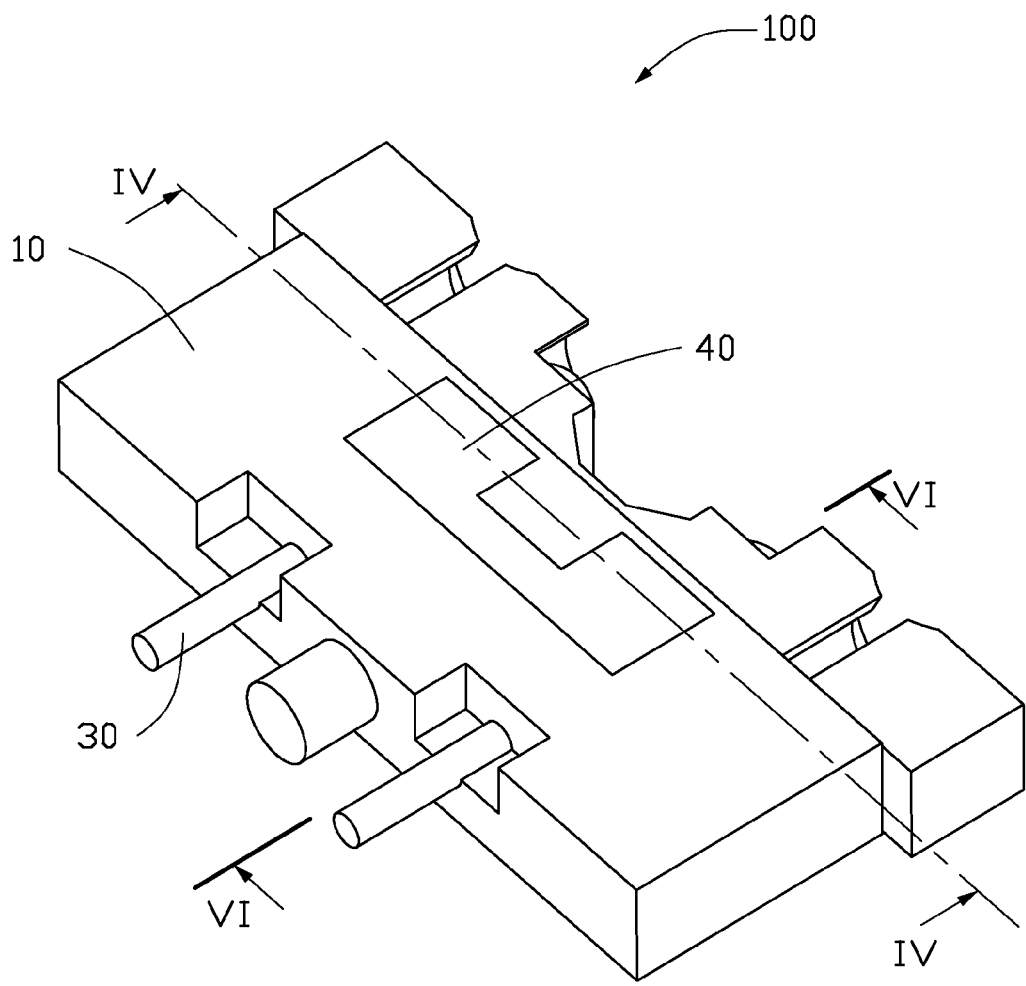
FIG. 1 is a schematic, isometric view of an optical fiber connector including a cover, according to an exemplary embodiment.
Figure 2:
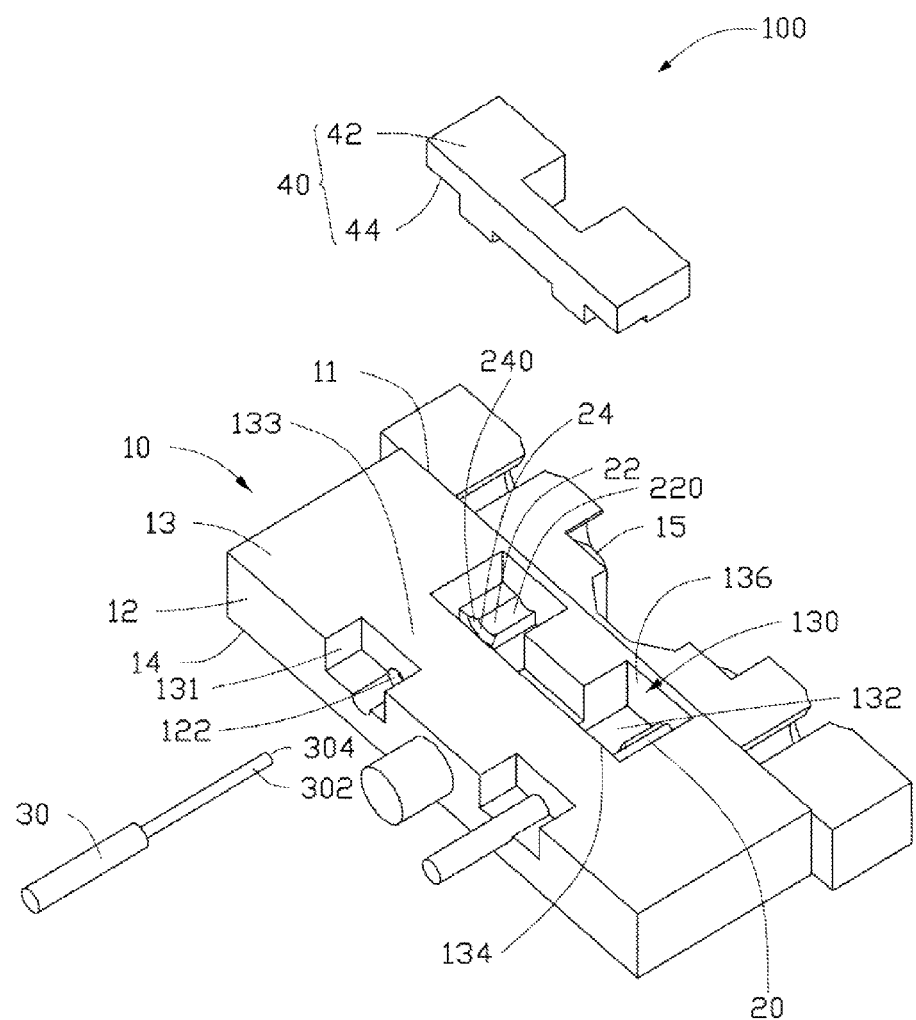
FIG. 2 is an exploded view of the optical fiber connector of FIG. 1.

Referring FIGS. 1-2, an optical fiber connector 100, according to an exemplary embodiment, includes a body 10, two supports 20, two optical fibers 30, and a cover 40.

The body 10 is substantially cuboid and transparent. The body 10 includes a first end 11, a second end 12, an upper wall 13, a lower wall 14, and two lenses 15. The first end 11 and the second end 12 are located at opposite sides of the body 10. The upper wall 13 is substantially parallel to the lower wall 14. The upper wall 13 perpendicularly connects the first end 11 to the second end 12. The lower wall 14 perpendicularly connects the first end 11 to the second end 12. The lenses 15 are positioned on the first end 11.

The second end 12 defines two through holes 122 for receiving the two optical fibers 30 respectively. The through holes 122 are parallel to each other and aligned with the lenses 15 respectively. The upper wall 13 includes two cutouts 131, a recess 130, and a separating portion 133. The cutouts 131 are exposed at the second end 12. Each of the cutouts 131 corresponds to a through hole 122, and each of the through holes 122 extends through the corresponding cutout 131. The recess 130 is arranged between the cutout 131 and the lenses 15. The separating portion 133 is arranged between the cutouts 131 and the recess 130, and separates the recess 130 from the cutouts 131. The body 10 includes a bottom surface 132, a first side surface 134, and a second side surface 136 in the recess 130. The first side surface 134 is adjacent to the second end 12. The second side surface 136 is opposite to the first side surface 134 and is adjacent to the lenses 15. The bottom surface 132 connects the first side surface 134 and the second side surface 136. Each of the through holes 122 starts from the second end 12, and then passes through the corresponding cutout 131, the separating portion 133, and finally terminates at the first side surface 134. The through holes 122 are exposed at the first side surface 134 to communicate with the recess 130. In this embodiment, the second side surface 136 coincides with a focal plane of the lens 15. In alternative embodiments, the second side surface 136 may be positioned on a plane parallel to the focal plane of the lens 15.

The supports 20 are received in the recess 130 and extend from the bottom surface 132. The supports 20 are aligned with the respective through holes 122 and the respective lenses 15. The supports 20 connect the second side surface 136 and the bottom surface 132. In one embodiment, each support 20 defines an arc-shaped receiving groove 22 and a lead angle 24. The receiving groove 22 extends along the insertion direction of the optical fiber 30 and terminates at the second side surface 136. The lead angle 24 is at a distal end of the support 20 and is positioned between the receiving groove 22 and the through hole 122. The peripheral surface 240 of the lead angle 24 is lower than the bottom 220 of the receiving groove 22. That is the support 20 includes a beveled edge 240 at a distal end of each receiving groove 22. In this embodiment, the supports 20 and the body 10 are formed into a unitary piece.

Each of the optical fibers 30 has a distal portion 302 exposed in the recess 130. When the optical fiber 30 is inserted into the through hole 122, the distal portion 302 is supported on the corresponding support 20. Light emitting surface 304 of the optical fiber 30 contacts the second side surface 136.

Figure 3:
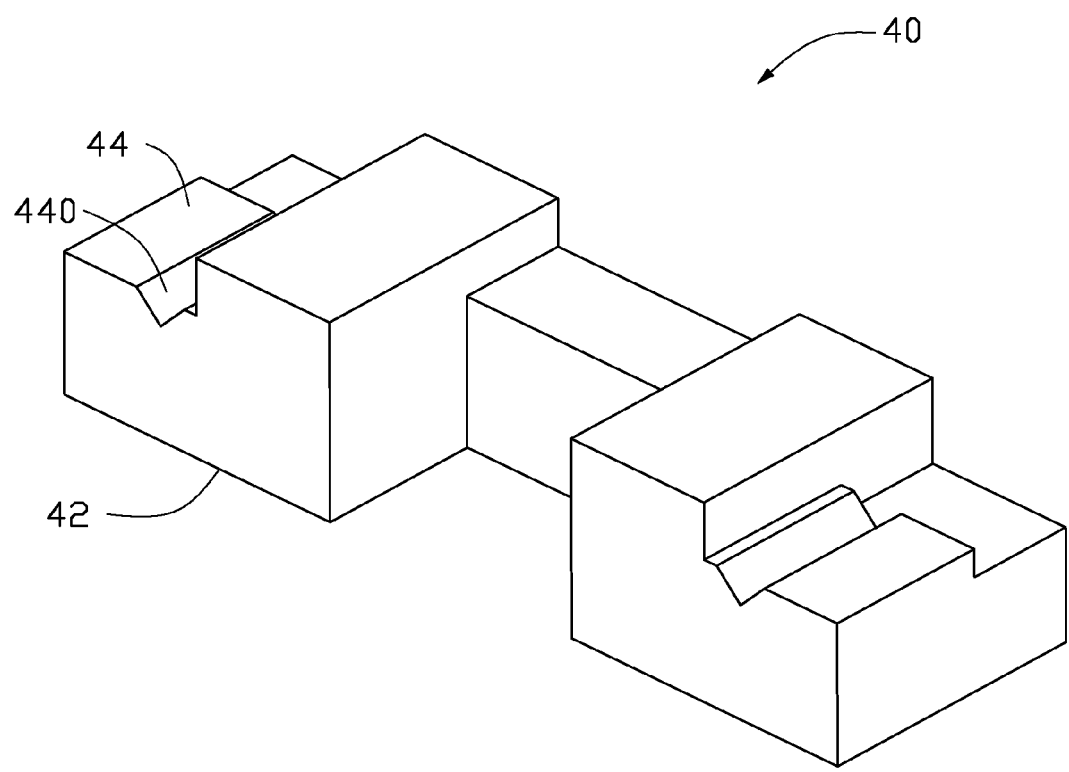
FIG. 3 is a schematic, isometric view of the cover of FIG. 1.
Figure 4:
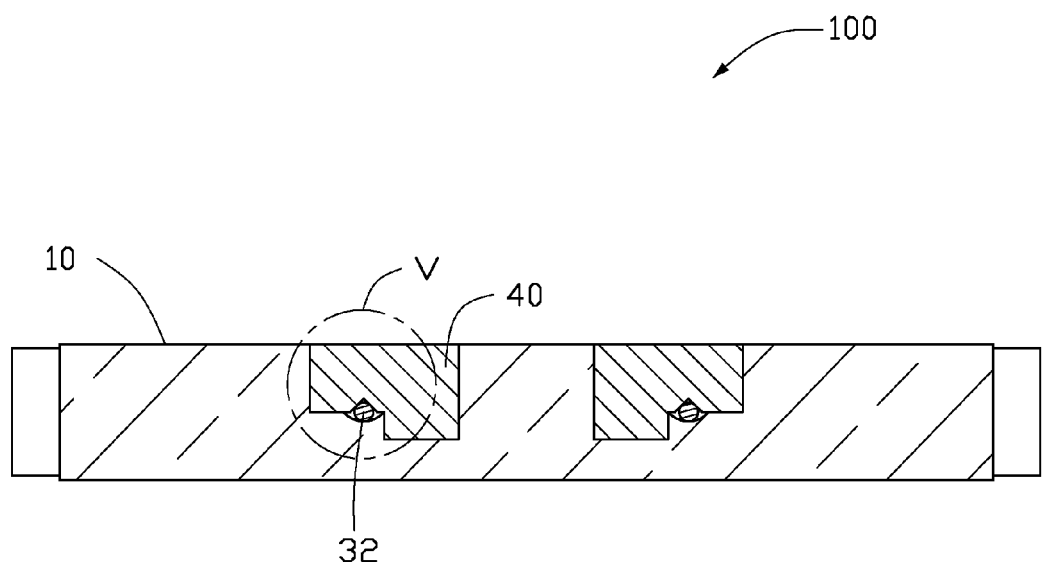
FIG. 4 is a sectional view of the optical fiber connector taken along the line IV-IV of FIG. 1.
Figure 5:
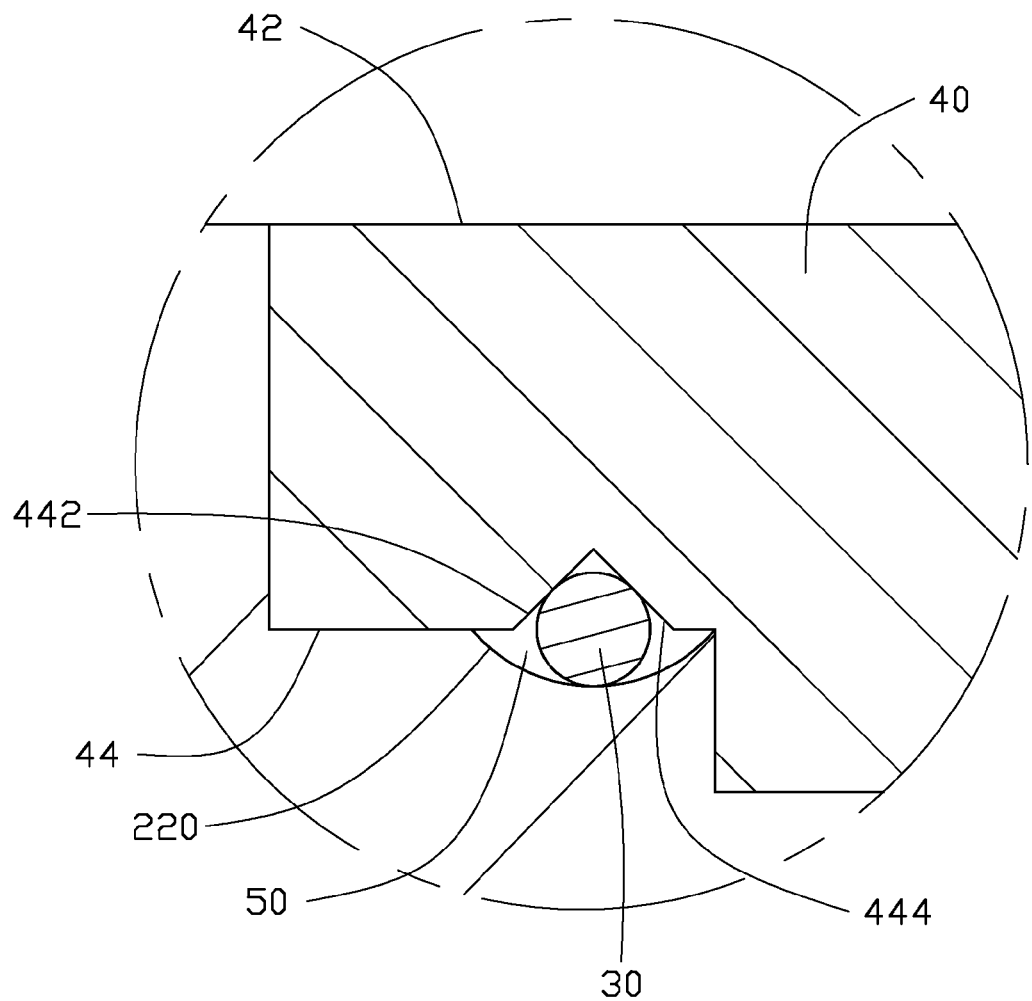
FIG. 5 is an enlarged view of a circled portion V of FIG. 4.
Figure 6:
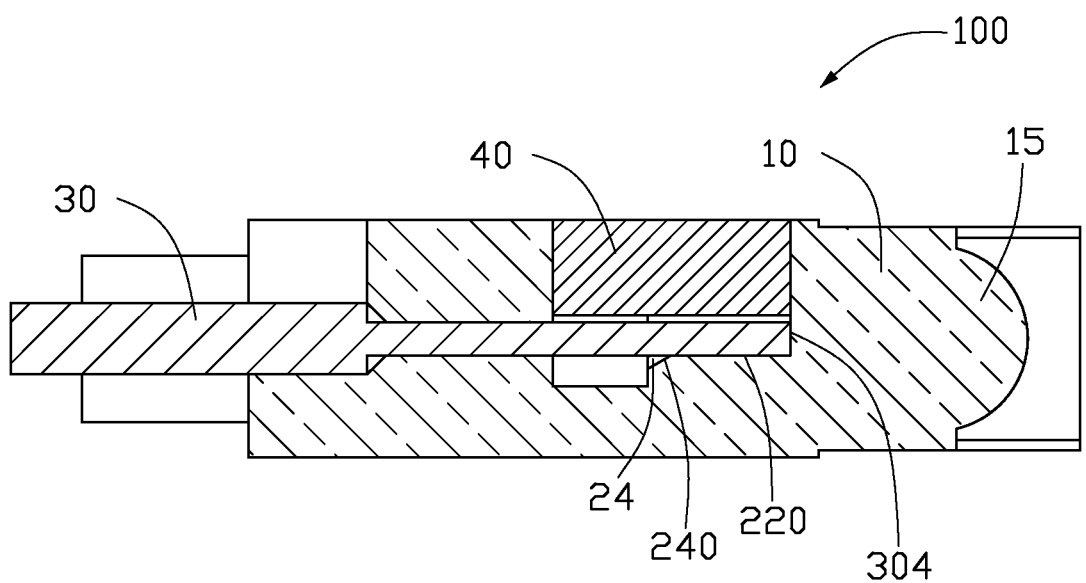
FIG. 6 is a sectional view of the optical fiber connector taken long the line VI-VI of FIG. 1.

Referring to FIGS. 3 and 5, the cover 40 is shaped to be received in the recess 130 and may be adhered to the body 10 in the recess 130 with adhesive. The cover 40 may be made of material transparent to ultraviolet light so that ultraviolet light can be used to cure the adhesive. The cover 40 is insertably engaged in the recess 130. The insertion direction of the cover 40 is substantially perpendicular to longitudinal axes of the through holes 122.

The cover 40 includes an upper surface 42 and a lower surface 44 opposite to the upper surface 42. The lower surface 44 defines two V-shaped positioning grooves 440. The cover 40 has a first slanted surface 442 and a second slanted surface 444 in each of the positioning grooves 440. The first slanted surface 442 connects the second slanted surface 444.

When the cover 40 seals the recess 130, the upper surface 42 is coplanar with the upper wall 13. The receiving groove 22 cooperates with the positioning groove 440 to define a receiving room 50 for receiving the distal portion 302 of the optical fiber 30. The bottom 220 of the receiving groove 22, the first slanted surface 442, and the second slanted surface 444 respectively abut the distal portion 302 of the corresponding optical fiber 30 so that the support 20 and the cover 40 cooperatively and securely retain the distal portion 302 of the optical fibers 30 in the recess 130 of the body 10. Cooperation between the supports 20 and the two slanted surfaces 442 and 444 can function as blind holes. The blind holes for receiving the optical fibers 30 can be omitted. Thus, making it is easier to mold the body 10 to desired tolerances with the supports 20 and the cover 40 with the slanted surfaces 442 and 444 than to mold a body with blind holes to desired tolerances.

In addition, the light emitting surface 304 of the optical fiber 30 contacts the second side surface 136, and the second side surface 136 coincides with a focal plane of the lens 15, thereby the respective optical fibers 30 can be precisely coupled with the lenses 15, and the transmission accuracy is assured. Furthermore, the peripheral surface 240 of the lead angle 24 is lower than the bottom 220 of the receiving groove 22, thereby protecting the light emitting surface 304 of the optical fiber 30 from damage when the optical fiber 30 is inserted into the body 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical fiber connector, comprising:
a plurality of optical fibers;
a body comprising a first end, a second end substantially parallel to the first end, an upper wall perpendicularly interconnected between the first end and the second end, a plurality of lenses at the first end, a plurality of cutouts defined in the upper wall and exposed at the second end, a recess defined in the upper wall and located between the lenses and the cutouts, a separating portion arranged between the cutouts and the recess and separating the cutouts from the recess, and a plurality of through holes corresponding to the cutouts and the lenses, each of the through holes starting from the second end and passing through the corresponding cutout and the separating portion to be in communication with the recess, the optical fibers extending through the respective through holes and optically coupled with the respective lenses;
a plurality of supports formed in the recess corresponding to the optical fibers, each of the supports defining an arc-shaped receiving, groove; and
a cover engagingly received in the recess, the cover defining a plurality of V-shaped positioning grooves corresponding to the receiving grooves of the supports, each of the positioning grooves having a first slanted surface and a second slanted surface, each of the positioning grooves and the corresponding receiving groove cooperatively securely retaining distal portion of the corresponding optical fiber in the recess of the body.

2. The optical fiber connector as claimed in claim 1, wherein the through holes are parallel to each other, the cover is insertably engaged in the recess, and an insertion direction of the cover is substantially perpendicular to longitudinal axes of the through holes.

3. The optical fiber connector as claimed in claim 1, wherein the recess comprises a bottom surface, a first side surface, and a second side surface opposite to the first side surface, the through holes are exposed at the first side surface to communicate with the recess, and each of the receiving grooves extends along the longitudinal axes of the through holes and terminates at the second inner surface.

4. The optical fiber connector as claimed in claim 3, wherein the second side surface coincides with as local plane of each of the lenses, and each of the optical fibers contacts the second side surface.

5. The optical fiber connector as claimed in claim 4, wherein the cover comprises an upper surface and a lower surface, the positioning grooves are defined in the lower surface, and the upper surface is coplanar with a surface of the upper wall.

6. The optical fiber connector as claimed in claim 3, wherein each of the supports defines a lead angle at a distal end thereof, the lead angle is positioned between the receiving groove and the through hole, and the peripheral surface of the lead angle is lower than the bottom of the receiving groove.

7. The optical fiber connector as claimed in claim 6, wherein the supports and the body are formed into a unitary piece.

8. The optical fiber connector as claimed in claim 1, wherein the cover is adhered to the body in the recess by adhesive.

9. The optical fiber connector as claimed in claim 1, wherein the cover is made of material transparent to ultraviolet light.

10. An optical fiber connector, comprising:
a plurality of optical fibers;
a body comprising a plurality of lenses at a first end thereof, a plurality of through holes at an opposite second end, and a recess located between the lenses and the through holes, the through holes being in communication with the recess, the optical fibers extending through the respective through holes and optically coupled with the respective lenses;
a plurality of supports formed in the recess corresponding to the optical fibers, the through holes, and the lenses, each of the supports defining an arc-shaped receiving groove and a lead angle at a distal end thereof, the lead angle positioned between the receiving groove and the corresponding through hole, the peripheral surface of the lead angle being lower than the bottom of the receiving groove; and
a cover engagingly received in the recess, the cover defining a plurality of V-shaped positioning grooves, each of the positioning grooves having a first slanted surface and a second slanted surface, each of the positioning grooves and the corresponding receiving groove cooperatively securely retaining distal portion of the corresponding optical fiber in the recess of the body.

11. The optical fiber connector as claimed in claim 10, wherein the supports and the body are formed into a unitary piece.

12. The optical fiber connector as claimed in claim 11, wherein the body further comprises an upper wall perpendicularly interconnected between the first end and the second end, the recess is defined in the upper wall, the cover comprises an upper surface and a lower surface, the positioning grooves are defined in the lower surface, and the upper surface is coplanar with a surface of the upper wall.

13. The optical fiber connector as claimed in claim 12, wherein the recess comprises a bottom surface, a first side surface, and a second side surface opposite to the first side surface, the through holes are exposed at the first side surface to communicate with the recess, and each of the receiving grooves extends along the longitudinal axes of the through holes and terminates at the second inner surface.

14. The optical fiber connector as claimed in claim 13, wherein the second side surface coincides with a focal plane of each of the lenses, and each of the optical fibers contacts the second side surface.

15. The optical fiber connector as claimed in claim 10, wherein the through holes are parallel to each other, the cover is insertably engaged in the recess, and an insertion direction of the cover is substantially perpendicular to longitudinal axes of the through holes.

16. The optical fiber connector as claimed in claim 10, wherein the cover is adhered to the body in the recess by adhesive.

17. The optical fiber connector as claimed in claim 10, wherein the cover is made of material transparent to ultraviolet light.

\* \* \* \* \*